Figure 1:
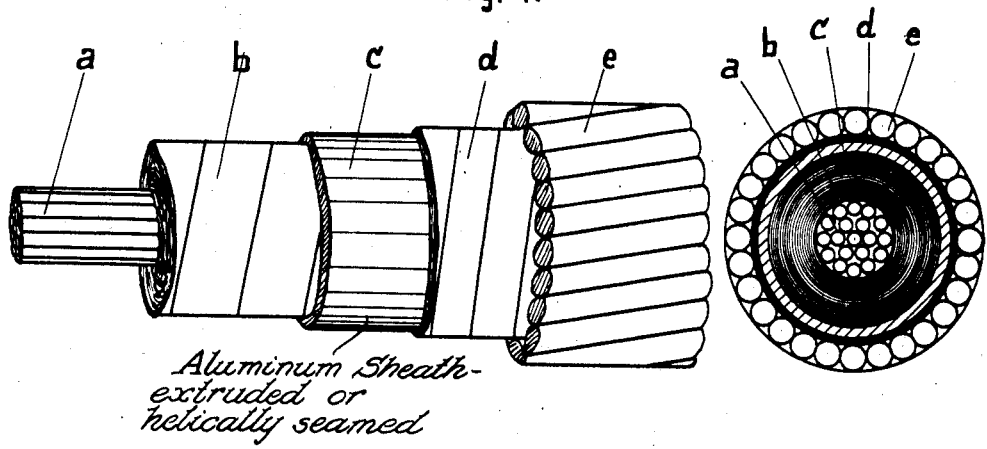

Nov. 27, 1934.     G. ZAPF     1,981,890
ELECTRIC CABLE
Filed Nov. 5, 1928

Aluminum Sheath-
extruded or
helically seamed

Aluminum Sheath-
extruded or
helically seamed

G. Zapf, INVENTOR

By: Marks & Clark
Attys.

Patented Nov. 27, 1934

1,981,890

UNITED STATES PATENT OFFICE 1,981,890

ELECTRIC CABLE

Georg Zapf, Cologne, Germany, assignor to Felten and Guilleaume Carlswerk Actien-Gesellschaft, Cologne-Mulheim, Germany Application November 5, 1928, Serial No. 317,384
In Germany November 19, 1927

3 Claims. (Cl. 173—266)

In order to protect the insulation of the conductors of electric cables against moisture and other influences, the core of the cable is, in most cases, surrounded by a closed lead sheathing, which is provided thereon by means of a press. Lead has a number of advantages which render it especially suitable for this application, for instance its capability of being easily shaped at temperatures of slightly over 300° C. and its resistance to chemical attack, which can be greatly improved by the addition of other metals. However, lead has certain disadvantages. It has a higher specific gravity (11.3), a resistance or tensile strength of only approximately 2 kgms. per sq. mm. and, as compared with other metals, it is not sufficiently elastic. The properties last mentioned lead, for instance in the case of high tension cables insulated by means of impregnated paper layers, to the lead sheathing being enlarged when the impregnation liquid expands in consequence of the heating of the cable without assuming its original shape when the cable is subsequently cooled, thereby causing the formation of hollow spaces within the sheathing.

According to the present invention the core of the cable is surrounded with a sheathing of aluminium or an alloy containing aluminium as the essential constituent. It has been found possible to treat pure aluminium and aluminium alloys in such a manner that they can be pressed into sheathings at the same temperatures as lead. In this case, the presses which have hitherto been used for applying lead sheathing can also be used for producing the aluminium sheathing.

By using the aluminium welding processes which have recently become known, aluminium sheathing may also be produced by winding the aluminium in the form of a strip around the core of the cable and by welding the seams. The heating which is thereby required is of such a duration that the cable cannot be damaged by it.

It is known to provide cables with an armouring constituted by wires of aluminium or aluminium alloy but the present invention does not refer to wire armourings but to sheathings in the form of a continuous and closed surface.

A further method of producing aluminium sheathings consists in this that the aluminium is wound in the form of a strip around the core of the cable and the edges of the strip folded within one another during the winding. By using suitable pressure means, it is possible to press the abutting edges against one another to such an extent that the sheathing makes a sufficiently tight joint to prevent the penetration of moisture into the interior of the cable.

Although aluminium is more expensive than lead, the prices of aluminium show a tendency to fall in consequence of the continuing progress in the aluminium industry. Owing to the resistance or tensile strength of the aluminium being 5–10 times greater than that of lead, any aluminium sheathing can be made so much thinner than a lead sheathing that even with the present prices, the prices of the two sheathings are the same. Even then, the resistance or tensile strength of the aluminium sheathing exceeds that of a corresponding lead sheathing. Owing to the small thickness of the sheathing and the substantially lower specific gravity of the aluminium (2.7), there is a substantial economy in weight as compared with a cable provided with a lead sheathing, which fact, together with increased resistance or tensile strength, allows the supporting and protecting members (armouring), more particularly of submarine cables, to be made of smaller dimensions. As regards resistance to corrosion, pure aluminium is superior to the lead alloys hitherto known.

The conductivity of aluminium is about seven times greater than that of lead. The effect thereof in the case of a telephone cable provided with an aluminium sheathing is that the current induced in the sheathing by a disturbing conductor carrying a large current is greater than in the case of a lead sheathing and consequently it compensates to a larger extent than in the case of a lead sheathing the induction of the disturbing conductor upon the telephone cores.

In the case of a single-core alternating current cable, a high conductivity of the sheathing is not desired. In this case a badly conducting aluminium alloy is preferably used if the eddy-currents produced in the sheathing cannot be sufficiently reduced by using a thin sheathing.

Figure 2:
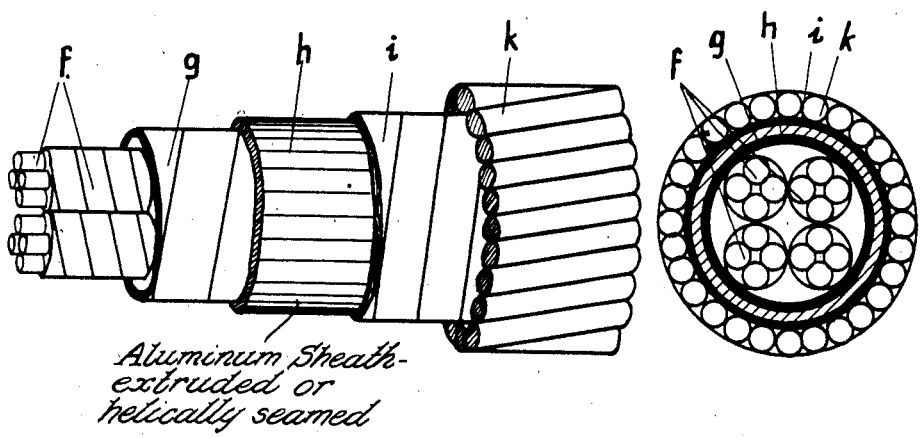

In the accompanying drawing, Figure 1 illustrates, by way of example, a high tension cable and Figure 2 a telephone cable, both provided with aluminium sheathings.

In Figure 1, $a$ is a stranded copper conductor, $b$ the impregnated paper insulation, $c$ the aluminium sheathing, $d$ a bolster of jute and $e$ an armouring of round wire.

In Figure 2, $f$ are four quads, $g$ a paper insulation, $h$ the aluminium sheathing, $i$ a bolster of jute and $k$ the armouring.

What I claim is:—

1. An electric cable including a core and a sheathing comprising a strip largely of aluminum wound helically around said core the adjacent edges of said helically wound strip being welded together to form a watertight tube.

2. An electric cable including a conducting core, a covering of insulating material over said conducting core, a watertight seamless tube largely of aluminum over said insulation, a fibrous protective covering over said tube and a metallic armouring over said fibrous covering.

3. An electric cable including a core and a water-tight sheathing, said water-tight sheathing consisting essentially of aluminum and being of a constituency shapable at temperatures comparable with those for the shaping of lead, viz, somewhat over 300° C., and said water-tight sheathing being pressed in surrounding relation to said core.

GEORG ZAPF.